US006380147B1

(12) United States Patent
Speckmann et al.

(10) Patent No.: US 6,380,147 B1
(45) Date of Patent: Apr. 30, 2002

(54) DETERGENTS CONTAINING AMYLASE AND PROTEASE

(75) Inventors: Horst-Dieter Speckmann, Langenfeld; Beatrix Kottwitz, Duesseldorf; Karl-Heinz Maurer, Erkrath; Christian Nitsch, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/701,645

(22) PCT Filed: May 25, 1999

(86) PCT No.: PCT/EP99/03572

§ 371 Date: Feb. 9, 2001

§ 102(e) Date: Feb. 9, 2001

(87) PCT Pub. No.: WO99/63040

PCT Pub. Date: Dec. 9, 1999

(30) Foreign Application Priority Data

Jun. 3, 1998 (DE) ........................................ 198 24 705

(51) Int. Cl.[7] ............................. C11D 3/00; C11D 7/42; C12S 9/00

(52) U.S. Cl. ....................... 510/392; 510/320; 510/392; 510/530; 435/202; 435/203; 435/219; 435/220; 435/221

(58) Field of Search ................................ 510/392, 320, 510/530; 435/202, 203, 219, 220, 221

(56) References Cited

U.S. PATENT DOCUMENTS

| | | | | |
|---|---|---|---|---|
| 1,227,374 A | | 5/1917 | Boidin et al. | |
| 2,560,097 A | | 7/1951 | Emerson et al. | 252/89 |
| 3,234,258 A | | 2/1966 | Morris | |
| 3,951,821 A | | 4/1976 | Davidson | 252/1 |
| 4,269,859 A | | 5/1981 | Morse | 424/362 |
| 4,585,642 A | | 4/1986 | Rieck | |
| 4,664,839 A | | 5/1987 | Rieck | |
| 4,820,439 A | | 4/1989 | Rieck | |
| 4,898,621 A | | 2/1990 | Pruehs et al. | |
| 4,985,553 A | | 1/1991 | Fuertes et al. | |
| 5,075,041 A | | 12/1991 | Lutz | |
| 5,183,651 A | | 2/1993 | Schimmel et al. | |
| 5,229,095 A | | 7/1993 | Schimmel et al. | |
| 5,268,156 A | | 12/1993 | Schimmel et al. | |
| 5,308,596 A | | 5/1994 | Kotzian et al. | |
| 5,318,733 A | | 6/1994 | Carduck et al. | |
| 5,340,735 A | | 8/1994 | Christianson et al. | |
| 5,356,607 A | | 10/1994 | Just | |
| 5,382,377 A | | 1/1995 | Raehse et al. | |
| 5,417,951 A | | 5/1995 | Just | |
| 5,541,316 A | | 7/1996 | Engelskirchen et al. | |
| 5,580,941 A | | 12/1996 | Krause et al. | |
| 5,616,550 A | | 4/1997 | Kruse et al. | |
| 5,707,950 A | * | 1/1998 | Kasturi et al. | 510/320 |
| 5,783,616 A | | 7/1998 | Krause et al. | |
| 5,798,328 A | | 8/1998 | Kottiwitz et al. | |
| 5,830,956 A | | 11/1998 | Stockhausen et al. | |
| 5,847,065 A | | 12/1998 | Krause et al. | |
| 5,854,191 A | | 12/1998 | Krause et al. | |
| 5,854,321 A | | 12/1998 | Krause et al. | |
| 5,922,670 A | | 7/1999 | Knuebel et al. | |
| 5,929,008 A | * | 7/1999 | Goldstein | 510/221 |
| 6,075,001 A | | 6/2000 | Wilde | |

FOREIGN PATENT DOCUMENTS

| | | |
|---|---|---|
| CA | 1036455 | 8/1978 |
| DE | 2 412 837 | 10/1974 |
| DE | 23 62 595 | 6/1975 |
| DE | 42 21 381 | 2/1994 |
| DE | 43 00 772 | 7/1994 |
| DE | 43 03 320 | 8/1994 |
| DE | 43 21 022 | 1/1995 |
| DE | 44 17 734 | 11/1995 |
| DE | 44 43 177 | 6/1996 |
| DE | 195 03 061 | 8/1996 |
| DE | 195 13 391 | 10/1996 |

(List continued on next page.)

OTHER PUBLICATIONS

H.P. Rieck, Alltägliches mit High–Tech–Dimension, Hoechst High Chem Magazin 14 (1993), pp 33–38.

F.–J. Dany et al., Kristallines Schichtsilikat—ein neuer Builder, Seifen—Öle—Fette—Wachse—116. Jg.—Nr. 20 (1990), pp 805–808.

A. Recktenwald et al., Minireview Protein engineering and design Method and the industrial relevance, J. Biotech., 28 (1993), pp 1–23.

D.W. Goddette et al., The Crystal Structure of the Bacillus lentus Alkaline Protease, Subtilisin BL, at 1·4 Å Resolution, J. Mol. Biol. (1992) 228, pp 580–595.

H. Malmos, Enzyme in Waschmitteln, Seifen—Öle—Fette—Wachse—117. Jg.—Nr.—Nr. 5 (1991), pp 174–177.

M. Bahn & R.D. Schmid, Microbial Genetic Engineering and Enzyme Technology, Biotec 1 (1987), pp 119–131.

J. Kraut, Serine Proteases: Structure and Mechanism of Catalysis, Ann Rev. Biochem. (1977) 46:331–58.

H. G. van Raay et al., Zur Bestimmung der proteolytischen Aktivität in Enzymkonzentraten und enzymhaltigen Wasch–, Spülund Reinigungsmitteln, Tenside Detergents, 7 Jahrgang, Heft 3, (1970), pp 125–132.

Determination of Serum Proteins By Means Of The Biuret Reaction, Allan G. Gornall et al., (rec'd for publication, Aug. 2, 1948) pp 751–767.

International Search Report for PCT/DE 98/00589.

*Primary Examiner*—Yogendra N. Gupta
*Assistant Examiner*—Eisa Elhilo
(74) *Attorney, Agent, or Firm*—Glenn E. J. Murphy

(57) ABSTRACT

The invention relates to detergents characterized in that they contain α-amylase from *Bacillus amyloliquefaciens* and protease from *Bacillus lentus*, optionally modified by genetic engineering, in addition to our usual ingredients compatible with said enzymes.

18 Claims, No Drawings

FOREIGN PATENT DOCUMENTS

| | | |
|---|---|---|
| DE | 196 16 693 | 11/1997 |
| DE | 196 16 767 | 11/1997 |
| DE | 196 16 769 | 11/1997 |
| DE | 196 16 770 | 11/1997 |
| DE | 197 00 327 | 7/1998 |
| DE | 198 19 187 | 11/1999 |
| EP | 0 164 514 | 12/1985 |
| EP | 0 164 552 | 12/1985 |
| EP | 0 232 202 | 8/1987 |
| EP | 0 294 753 | 12/1988 |
| EP | 0 300 305 | 1/1989 |
| EP | 0 425 427 | 5/1991 |
| EP | 0 436 835 | 7/1991 |
| EP | 0 446 982 | 9/1991 |
| EP | 0 452 428 | 10/1991 |
| EP | 0 453 003 | 10/1991 |
| EP | 0 486 592 | 5/1992 |
| EP | 0 502 325 | 9/1992 |
| EP | 0 525 239 | 2/1993 |
| EP | 0 548 599 | 6/1993 |
| EP | 0 564 476 | 10/1993 |
| EP | 0 625 992 | 11/1994 |
| EP | 0 642 576 | 3/1995 |
| JP | 58-217598 | 12/1983 |
| JP | 4-238809 | 8/1992 |
| JP | 4-260610 | 9/1992 |
| WO | WO 92/18542 | 10/1992 |
| WO | WO 94/18314 | 8/1994 |
| WO | WO 94/23005 | 10/1994 |
| WO | WO 94/27970 | 12/1994 |
| WO | WO 94/28102 | 12/1994 |
| WO | WO 94/28103 | 12/1994 |
| WO | WO 95/00626 | 1/1995 |
| WO | WO 95/07331 | 3/1995 |
| WO | WO 95/14075 | 5/1995 |
| WO | WO 95/14759 | 6/1995 |
| WO | WO 95/17498 | 6/1995 |
| WO | WO 95/19953 | 7/1995 |
| WO | WO 95/19954 | 7/1995 |
| WO | WO 95/19955 | 7/1995 |
| WO | WO 95/21247 | 8/1995 |
| WO | WO 95/22592 | 8/1995 |
| WO | WO 95/23221 | 8/1995 |
| WO | WO 95/28463 | 10/1995 |
| WO | WO 96/00772 | 1/1996 |
| WO | WO 96/00773 | 1/1996 |
| WO | WO 97/03156 | 1/1997 |
| WO | WO 98/07818 | 2/1998 |

DETERGENTS CONTAINING AMYLASE AND PROTEASE

The present invention relates to enzyme containing detergents comprising besides customary constituents an amylase from *Bacillus amyloliquefaciens* and a certain protease.

Amylases have the function of facilitating the removal of starchy stains by means of catalytic hydrolysis of the starch polysaccharide, and have been used for this purpose for a fairly long time in dishwashing detergents, but also in detergents for use in textile laundering. In by far the great majority of cases the amylase involved has comprised a heat-stable amylase from *Bacillus licheniformis*, which is customary in commerce under the designation Termamyl®, for example. More recently, there has been increased use in such compositions of genetically manipulated amylases; that is, amylases whose amino acid sequence has been altered, using gene technology methods, in comparison to naturally occurring amylases. As well as increasing their capacity to perform, the objective of genetically modifying amylases is essentially to enhance the stability of the enzyme, especially their stability to attack by oxidizing agents. One approach toward achieving this objective, which was proposed in International Patent Application WO 94/18314, consists in removing particularly oxidation-susceptible amino acids, such as methionine, tryptophan, cysteine or tyrosine, from the amino acid sequence of the amylase, or replacing them by other amino acids more stable to oxidation. A similar approach is proposed in International Patent Application WO 95/21247, which recommends replacing at least one methionine in the amylase amino acid sequence by an amino acid which is neither methionine nor cysteine.

Although such genetic modifications may lead to improved amylase stability under certain application conditions, they do not help to increase the contribution of the amylase to the wash or cleaning performance of corresponding compositions comprising the amylase.

Besides amylases, other enzymes, especially proteolytic enzymes, are being used to an increased extent in laundry detergents, laundering assistants, and cleaning products. Those used at present comprise almost exclusively proteases from the subtilisin family. This family comprises extracellular proteins having a molecular weight in the range from about 20,000 to 45,000. Subtilisins are relatively unspecific enzymes which in addition to the hydrolytic effect on peptide bonds also have esterolytic properties (M. Bahn and R. D. Schmidt, Biotec 1, 119, 1987). Many representatives of the subtilisins have been the subject of precise physical and chemical characterization. Their three-dimensional structure is often known in detail through X-ray structural analysis. This has provided the prerequisites for molecular modeling and so-called protein engineering in the form of site-directed mutagenesis (Kraut, Ann. Rev. Biochem. 46, 331–358, 1977). Genetic modifications of proteases have been described on numerous occasions; in June 1991, for instance, there were already 219 known protein variants of the subtilisin obtained by protein engineering (A. Recktenwald et al., J. Biotechnol. 28, 1–23, 1993). The majority of these variants have been produced in order to enhance the stability of the proteases.

A protease from the subtilisin family which is active and stable under strongly alkaline conditions may be produced as described in International Patent Application WO 91/02792 in *Bacillus lentus* (DSM 5483). This *Bacillus lentus* alkaline protease (BLAP) can be produced by fermenting *Bacillus licheniformis* transformed using an expression plasmid which carries the gene for BLAP under the control of the promoter from *Bacillus licheniformis* ATCC 53926. Both the composition and three-dimensional structure of BLAP are known (D. W. Godette et al., J. Mol. Biol. 228, 580–595, 1992). This protease is characterized by the 269 amino acid sequence described in the cited literature, a calculated molecular weight of 26,823 daltons, and a theoretical isoelectric point of 9.7. Variants, accessible by mutation, of this *Bacillus lentus* DSM 5483 protease are described in U.S. Pat. No. 5,340,735. They include protease enzymes which lead to particularly low substrate damage, or destruction of the fiber assemblies, when textiles comprising proteinogenic fibers—for example, sheetlike textile structures of natural silk or wool—are laundered, especially when they are laundered repeatedly, and do so with no loss in cleaning performance.

It has surprisingly now been found that the combination of an optionally genetically manipulated protease from *Bacillus lentus* as described above and a naturally occurring α-amylase leads to unexpectedly synergistic performance improvements when used in detergents.

The invention accordingly provides an amylase and protease containing detergent which comprises, in addition to customary ingredients compatible with such enzymes, α-amylase from *Bacillus amyloliquefaciens* and protease from *Bacillus lentus*, which protease may optionally have been genetically manipulated.

The invention further provides for the use of a combination of α-amylase from *Bacillus amyloliquefaciens* and protease from *Bacillus lentus*, which protease may optionally have been genetically manipulated, for enhancing the cleaning performance of detergents, especially with respect to starchy stains, when used in detergent solutions, especially aqueous detergent solutions. α-Amylase from *Bacillus amyloliquefaciens* has been known for a long time, for example, from the U.S. Pat. No. 1,227,374. It is available commercially, for example, under the designation Amylase BAN®.

A composition of the invention contains preferably from 0.001 mg to 0.5 mg, in. particular from 0.02 mg to 0.3 mg, of amylolytic protein per gram of the overall composition. The protein concentration may be determined using known methods, such as the bicinchonic acid technique (BCA technique, Pierce Chemical Co., Rockford, Ill.) or the Biuret technique (A. G. Gornall, C. S. Bardawill and M. M. David, J. Biol. Chem. 177, 751–766, 1948).

The composition preferably has a proteolytic activity in the range from about 100 PU/g to about 10,000 PU/g, in particular from 300 PU/g to 8000 PU/g. The protease activity is determined in accordance with the standardized method described below, as described in Tenside 7 (1970), 125: a solution of 12 g/l casein and 30 mM sodium tripolyphosphate in water of hardness 15° dH [German hardness] (containing 0.058% by weight $CaCl_2.2H_2O$, 0.028% by weight $MgCl_2.6H_2O$ and 0.042% by weight $NaHCO_3$) is heated to 70° C. and the pH is adjusted to 8.5 at 50° C. by adding 0.1 N NaOH. 200 ml of a solution of the test enzyme in 2 percent strength by weight sodium tripolyphosphate buffer solution (pH 8.5) are added to 600 ml of the substrate solution. The reaction mixture is incubated at 50° C. for 15 minutes. The reaction is then stopped by adding 500 ml TCA solution (0.44 M trichloroacetic acid and 0.22 M sodium acetate in 3 percent strength by volume acetic acid) and cooling (ice bath at 0° C., 15 minutes). The TCA-insoluble protein is removed by centrifugation and 900 ml of the supernatant are diluted with 300 ml of 2 N NaOH. The absorbance of this solution at 290 nm is determined using an absorption spectrometer, the blank absorbance value being determined by measuring a centrifuged solution prepared by mixing 600 ml of the abovementioned TCA solution with 600 ml of the abovementioned substrate solution and then adding the enzyme solution. The proteolytic activity of a protease solution which under the stated measurement conditions brings about an absorbance of 0.500 OD is defined as 10 PU (protease units) per ml.

The proteases which can be used in accordance with the invention include not only the naturally occurring protease from *Bacillus lentus* but also genetically modified proteases of the abovementioned BLAP type in which in position 211 (BLAP numeration) the amino acid leucine (L in the common one-letter code) present at this position in the wild type protease has been replaced by aspartic acid (D) or glutamic acid (E) (L211D and L211E, respectively). These may be prepared as described in International Patent Application WO 95/23221. Instead of this or in addition to this it is possible for further modifications to have been made relative to the original *Bacillus lentus* protease, such as, for example, at least one of the amino acid replacements S3T, V4I, R99G, R99A, R99S, A188P, V193M and/or V199I. Particular preference is given to the use of a variant in which the amino acid replacements S3T+V4I+V193M+V199I+L211D have been performed. In the context of the above-described protease nomenclature relating to the replacement of individual amino acids, it should be noted that the numbering of the amino acid positions in BLAP differs from the frequently encountered numbering of subtilisin BPN'. The numbering of positions 1 to 35 is identical in subtilisin BPN' and BLAP; owing to a lack of corresponding amino acids, the positions 36 to 54 in BLAP correspond to positions 37 to 55 in BPN'; positions 55 to 160 in BLAP correspond to positions 57 to 162 in BPN'; and positions 161 to 269 correspond to 167 to 275 in BPN'.

Especially for use in particulate compositions, as described for other enzymes, for example, in European Patent EP 0 564 476 or in International Patent Application WO 94/23005, the enzymes may have been adsorbed on carrier substances and/or embedded in coating substances in order to protect them against premature inactivation. In compositions of the invention, the combination of amylase and genetically modified protease, which is essential to the invention, may be used by incorporating the two separate enzymes, or conventionally separately compounded enzymes, or by protease and amylase compounded together in granules, as known, for example, from International Patent Applications WO 96/00772 or WO 96/00773.

In addition to the enzyme combination used in accordance with the invention, the detergents of the invention, which may be present as solids, especially pulverulent solids, in postcompacted particle form, as homogeneous solutions or suspensions may in principle comprise all known ingredients which are customary in such compositions. The compositions of the invention may in particular comprise builder substances, surface-active surfactants, bleaches based on organic and/or inorganic peroxygen compounds, bleach activators, water miscible organic solvents, additional enzymes, sequesterants, electrolytes, pH regulators, and further auxiliaries, such as optical brighteners, graying inhibitors, color transfer inhibitors, foam regulators, silver corrosion inhibitors, and also dyes and fragrances.

The compositions of the invention may comprise a surfactant or two or more surfactants, suitable surfactants comprising in particular anionic surfactants, nonionic surfactants and mixtures thereof, but also cationic, zwitterionic and amphoteric surfactants.

Suitable anionic surfactants are, in particular, soaps and those containing sulfate or sulfonate groups. Preferred surfactants of the sulfonate type are $C_{9-13}$ alkylbenzenesulfonates, olefinsulfonates, i.e., mixtures of alkenesulfonates and hydroxyalkanesulfonates, and also disulfonates, as are obtained, for example, from $C_{12-18}$ monoolefins having a terminal or internal double bond by sulfonating with gaseous sulfur trioxide followed by alkaline or acidic hydrolysis of the sulfonation products. Also suitable are alkanesulfonates, which are obtained from $C_{12-18}$ alkanes, for example, by sulfochlorination or sulfoxidation with subsequent hydrolysis or neutralization, respectively. Likewise suitable, in addition, are the esters of $\alpha$-sulfo fatty acids (ester sulfonates), e.g., the $\alpha$-sulfonated methyl esters of hydrogenated coconut, palm kernel or tallow fatty acids, which are prepared by $\alpha$-sulfonation of the methyl esters of fatty acids of plant and/or animal origin having 8 to 20 carbon atoms in the fatty acid molecule, followed by neutralization to give water-soluble mono-salts. Preferably, these comprise the $\alpha$-sulfonated esters of hydrogenated coconut, palm, palm kernel or tallow fatty acids, it being possible as well for sulfonation products of unsaturated fatty acids, e.g. oleic acid, to be present in small amounts, preferably in amounts of not more than about 2 to 3% by weight. Particular preference is given to $\alpha$-sulfo fatty acid alkyl esters having an alkyl chain of not more than 4 carbon atoms in the ester group, examples being methyl esters, ethyl esters, propyl esters, and butyl esters. With particular advantage, the methyl esters of the $\alpha$-sulfo fatty acids (MES) are used, and also their saponified di-salts. Further suitable anionic surfactants are sulfated fatty acid glycerol esters which are the monoesters, diesters and triesters, and mixtures thereof, as obtained in the preparation by esterification of a monoglycerol with from 1 to 3 mol of fatty acid or in the transesterification of triglycerides with from 0.3 to 2 mol of glycerol. Preferred alk(en)yl sulfates are the alkali metal salts, and especially the sodium salts, of the sulfuric monoesters of $C_{12}$–$C_{18}$ fatty alcohols, examples being those of coconut fatty alcohol, tallow fatty alcohol, lauryl, myristyl, cetyl or stearyl alcohol, or of $C_{10}$–$C_{20}$ oxo alcohols, and those monoesters of secondary alcohols of this chain length. Preference is also given to alk(en)yl sulfates of said chain length which contain a synthetic straight-chain alkyl radical prepared on a petrochemical basis, these sulfates possessing degradation properties similar to those of the corresponding compounds based on fatty-chemical raw materials. From a detergents standpoint, $C_{12}$–$C_{16}$ alkyl sulfates and $C_{12}$–$C_{15}$ alkyl sulfates, and also $C_{14}$–$C_{15}$ alkyl sulfates, are particularly preferred. In addition, 2,3-alkyl sulfates, which may for example be prepared in accordance with U.S. Pat. No. 3,234,258 or U.S. Pat. No. 5,075,041 and obtained as commercial products from Shell Oil Company under the name DAN®, are suitable anionic surfactants. Also suitable are the sulfuric monoesters of the straight-chain or branched $C_{7-21}$ alcohols ethoxylated with from 1 to 6 mol of ethylene oxide, such as 2-methyl-branched $C_{9-11}$ alcohols containing on average 3.5 mol of ethylene oxide (EO) or $C_{12-18}$ fatty alcohols containing from 1 to 4 EO. Owing to their high foaming behavior, they are normally used in detergents only in relatively small amounts, for example in amounts of from 1 to 5% by weight. Preferred anionic surfactants further include the salts of alkylsulfosuccinic acid, which are also referred to as sulfosuccinates or as sulfosuccinic esters and which constitute the monoesters and/or diesters of sulfosuccinic acid with alcohols, preferably fatty alcohols and especially ethoxylated fatty alcohols. Preferred sulfosuccinates comprise $C_{8-18}$ fatty alcohol radicals or mixtures thereof. Especially preferred sulfosuccinates contain a fatty alcohol radical derived from ethoxylated fatty alcohols which themselves represent nonionic surfactants. Particular preference is given in turn to sulfosuccinates whose fatty alcohol radicals are derived from ethoxylated fatty alcohols having a narrowed homolog distribution. Similarly, it is also possible to use alk(en)ylsuccinic acid containing preferably 8 to 18 carbon atoms in the alk(en)yl chain, or salts thereof. Further suitable anionic surfactants include fatty acid derivatives of amino acids, for example, of N-methyltaurine (taurides) and/or of N-methylglycine (sarcosides). Particular preference is given here to sarcosides and to the sarcosinates and, of these, especially the sarcosinates of higher fatty acids, which may be mono- or polyunsaturated, such as oleyl sarcosinate. Further suitable anionic surfactants are, in particular, soaps. Suitable soaps include in particular saturated fatty acid soaps, such as the salts of lauric acid, myristic acid, palmitic acid, stearic acid, hydrogenated erucic acid and behenic acid, and, in particular, mixtures of soaps derived from natural fatty acids, e.g., coconut, palm kernel, or tallow fatty acids. Together with these soaps, or as substitutes for soaps, it is also possible to use the known alkenylsuccinic salts.

The anionic surfactants, including the soaps, may be present in the form of their sodium, potassium or ammonium salts and also as soluble salts of organic bases, such as mono-, di- or triethanolamine. Preferably, the anionic surfactants are in the form of their sodium or potassium salts, in particular in the form of the sodium salts.

Suitable nonionic surfactants are, in particular, alkyl glycosides and ethoxylation and/or propoxylation products of alkyl glycosides or linear or branched alcohols having in each case 12 to 18 carbon atoms in the alkyl moiety and from 3 to 12, preferably from 4 to 10, alkyl ether groups. It is also possible to use corresponding ethoxylation and/or propoxylation products of N-alkylamines, vicinal diols, fatty acid esters and fatty acid amides, which in terms of the alkyl moiety correspond to the aforementioned long chain alcohol derivatives, and also alkylphenols having 5 to 12 carbon atoms in the alkyl radical.

Nonionic surfactants used are preferably alkoxylated, advantageously ethoxylated, especially primary, alcohols having preferably 8 to 18 carbon atoms and on average from 1 to 12 mol of ethylene oxide (EO) per mole of alcohol, in which the alcohol radical may be linear or, preferably, methyl-branched in position 2 land/or may comprise linear and methyl-branched radicals in a mixture, as are commonly present in oxo alcohol radicals. In particular, however, preference is given to alcohol ethoxylates containing linear radicals from alcohols of natural origin having 12 to 18 carbon atoms, e.g., from coconut, palm, tallow fatty or oleyl alcohol and on average from 2 to 8 EO per mole of alcohol. Preferred ethoxylated alcohols include, for example, $C_{12-14}$ alcohols containing 3 EO or 4 EO, $C_{9-11}$ alcohols containing 7 EO, $C_{13-15}$ alcohols containing 3 EO, 5 EO, 7 EO or 8 EO, $C_{12-18}$ alcohols containing 3 EO, 5 EO or 7 EO, and mixtures thereof, such as mixtures of $C_{12-14}$ alcohol containing 3 EO and $C_{12-18}$ alcohol containing 7 EO. The stated degrees of ethoxylation represent statistical mean values, which for a specific product may be an integer or a fraction. Preferred alcohol ethoxylates have a narrowed homolog distribution (narrow range ethoxylates, NREs). In addition to these nonionic surfactants it is also possible to use fatty alcohols containing more than 12 EO. Examples thereof are (tallow) fatty alcohols containing 14 EO, 16 EO, 20 EO, 25 EO, 30 EO or 40 EO. Especially in detergents for use in machine dishwashing processes, it is common to use extremely low-foaming compounds. These include, preferably, $C_{12}$–$C_{18}$ alkyl polyethylene glycol-polypropylene glycol ethers having in each case up to 8 mol of ethylene oxide and propylene oxide units in the molecule. However, it is also possible to use other nonionic surfactants which are known to be low-foaming, such as, for example, $C_{12}$–$C_{18}$ alkyl polyethylene glycol-polybutylene glycol ethers having in each case up to 8 mol of ethylene oxide and butylene oxide units in the molecule, and also endgroup-capped alkyl polyalkylene glycol mixed ethers. Particular preference is also given to the hydroxyl-containing alkoxylated alcohols as are described in European Patent Application EP 0 300 305, referred to as hydroxy mixed ethers. The nonionic surfactants also include alkyl glycosides of the general formula $RO(G)_x$, where R is a primary straight-chain or methyl-branched aliphatic radical, especially an aliphatic radical methyl-branched in position 2, containing 8 to 22, preferably 12 to 18, carbon atoms, and G represents a glycose unit having 5 or 6 carbon atoms, preferably glucose. The degree of oligomerization, x, which indicates the distribution of monoglycosides and oligoglycosides, is any desired number—which, as a variable to be determined analytically, may also be a fraction—between 1 and 10; preferably, x is from 1.2 to 1.4. Further suitable surfactants are polyhydroxy fatty acid amides of the formula (I)

(I)

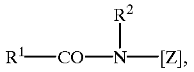

where $R^1CO$ is an aliphatic acyl radical having 6 to 22 carbon atoms, $R^2$ is hydrogen or an alkyl or hydroxyalkyl radical having 1 to 4 carbon atoms, and [Z] is a linear or branched polyhydroxyalkyl radical having 3 to 10 carbon atoms and from 3 to 10 hydroxyl groups. The polyhydroxy fatty acid amides are derived preferably from reducing sugars having 5 or 6 carbon atoms, especially glucose. The group of the polyhydroxy fatty acid amides also includes compounds of the formula (II)

(II)

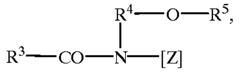

where $R^3$ is a linear or branched alkyl or alkenyl radical having 7 to 12 carbon atoms, $R^4$ is a linear, branched or cyclic alkylene radical or an arylene radical having 2 to 8 carbon atoms and $R^5$ is a linear, branched or cyclic alkyl radical or an aryl radical or an oxyalkyl radical having 1 to 8 carbon atoms, preference being given to $C_1$–$C_4$ alkyl radicals or phenyl radicals, and [Z] is a linear polyhydroxyalkyl radical whose alkyl chain is substituted by at least two hydroxyl groups, or alkoxylated, preferably ethoxylated or propoxylated, derivatives of said radical. Here too, [Z] is preferably obtained by reductive amination of a sugar such as glucose, fructose, maltose, lactose, galactose, mannose, or xylose. The N-alkoxy- or N-aryloxy-substituted compounds may then be converted to the desired polyhydroxy fatty acid amides, for example, in accordance with the teaching of International Patent Application WO 95/07331 by reaction with fatty acid methyl esters in the presence of an alkoxide as catalyst. A further class of nonionic surfactants used with preference, which are used either as sole nonionic surfactant or in combination with other nonionic surfactants, in particular together with alkoxylated fatty alcohols and/or alkyl glycosides, are alkoxylated, preferably ethoxylated, or ethoxylated and propoxylated, fatty acid alkyl esters, preferably having 1 to 4 carbon atoms in the alkyl chain, especially fatty acid methyl esters, as are described, for example, in Japanese Patent Application JP 58/217598, or those prepared preferably by the process described in International Patent Application WO 90/13533. Nonionic surfactants of the amine oxide type, examples being N-cocoalkyl-N,N-dimethylamine oxide and N-tallowalkyl-N,N-dihydroxyethylamine oxide, and of the fatty acid alkanolamide type, may also be suitable. The amount of these nonionic surfactants is preferably not more than that of the ethoxylated fatty alcohols, in particular not more than half thereof. Further suitable surfactants include those known as gemini surfactants. This term is used generally to refer to those compounds which possess two hydrophilic groups per molecule. These groups are generally separated from one another as a result of what is known as a spacer. This spacer is generally a carbon chain, which should be long enough to give the hydrophilic groups a sufficient spacing to allow them to act independently of one another. Surfactants of this kind are generally notable for an unusually low critical micelle concentration and the ability to reduce greatly the surface tension of water. In exceptional cases, however, the expression gemini surfactants is used to embrace not only dimeric but also, correspondingly, trimeric surfactants. Examples of suitable gemini surfactants are sulfated hydroxy mixed ethers in By accordance with German Patent Application DE 43 21 022 or dimer alcohol bis- and trimer alcohol tris-sulfates and ether sulfates in accordance with German Patent Application DE 195 03 061. Endgroup-capped dimeric and trimeric mixed ethers in accordance with German Patent Application DE-A-195 13 391 are notable in particular for their bi- and multifunctionality. Thus said endgroup-capped surfactants possess good wetting properties and are low-foaming, so making them particularly suitable for use in machine washing or cleaning processes. However, it is also possible to use gemini-polyhydroxy fatty acid amides or polypolyhydroxy fatty acid amides, as described in International Patent Applications WO 95/19953, WO 95/19954, and WO 95/19955.

In laundry detergents of the invention, surfactants are present in proportions of preferably from 5% by weight to 50% by weight, in particular from 8% by weight to 30% by weight, whereas compositions for cleaning hard surfaces, especially for the machine cleaning of kitchen- and tableware, have lower surfactant contents of up to 10% by weight, in particular up to 5% by weight, and preferably in the range from 0.5% by weight to 3% by weight.

A composition of the invention comprises preferably at least one water soluble and/or water insoluble, organic and/or inorganic builder. The water soluble organic builder substances include polycarboxylic acids, especially citric acid and sugar acids, monomeric and polymeric amino polycarboxylic acids, in particular methylglycinediacetic acid, nitrilotriacetic acid and ethylenediaminetetraacetic acid, and also polyaspartic acid, polyphosphonic acids, especially aminotris-(methylenephosphonic acid), ethylenediaminetetrakis-(methylenephosphonic acid) and 1-hydroxyethane-1,1-diphosphonic acid, polymeric hydroxy compounds such as dextrin, and also polymeric (poly) carboxylic acids, especially the polycarboxylates of European Patent EP 0 625 992 or of International Patent Application WO 92/18542 or of European Patent EP 0 232 202, which are obtainable by oxidizing polysaccharides or, respectively, dextrins; polymeric acrylic acids, methacrylic acids, maleic acids and copolymers thereof, which may also contain in copolymerized form small fractions of polymerizable substances without carboxylic acid functionality. The relative molecular mass of the homopolymers of unsaturated carboxyclic acids is generally between 3000 and 200,000, that of the copolymers between 2000 and 200,000, preferably from 30,000 to 120,000, based in each case on free acid. A particularly preferred acrylic acid-maleic acid copolymer has a relative molecular mass of from 30,000 to 100,000. Commercially customary products are, for example, Sokalan® CP 5, CP 10 and PA 30 from BASF. Suitable though less preferred compounds of this class are copolymers of acrylic acid or methacrylic acid with vinyl ethers, such as vinyl methyl ethers, vinyl esters, ethylene, propylene and styrene, in which the acid fraction is at least 50% by weight. As water soluble organic builder substances it is also possible to use terpolymers containing as monomers two unsaturated acids and/or their salts and, as the third monomer, vinyl alcohol and/or an esterified vinyl alcohol or a carbohydrate. The first acidic monomer or salt thereof is derived from a monoethylenically unsaturated $C_3$–$C_8$ carboxylic acid and, preferably, from a $C_3$–$C_4$ monocarboxylic acid, especially from (meth)acrylic acid. The second acidic monomer or salt thereof may be a derivative of a $C_4$–$C_8$ dicarboxylic acid, maleic acid being particularly preferred, and/or a derivative of an allylsulfonic acid substituted in position 2 by an alkyl or aryl radical. Such polymers may be prepared in particular by processes which are described in German Patent DE 42 21 381 and German Patent Application DE 43 00 772, and generally have a relative molecular mass of between 1000 and 200,000. Further preferred copolymers are those described in German Patent Applications DE 43 03 320 and DE 44 17 734, containing as monomers preferably acrolein and acrylic acid/acrylic acid salts, and/or vinyl acetate. The organic builder substances, especially for the preparation of liquid compositions, may be used in the form of aqueous solutions, preferably aqueous solutions with a strength of from 30 to 50 percent by weight. All said acids are generally used in the form of their water soluble salts, especially their alkali metal salts.

Organic builder substances of this kind may be present, if desired, in amounts of up to 40% by weight, in particular up to 25% by weight, and preferably from 1% by weight to 8% by weight. Amounts close to the stated upper limit are used preferably in pastelike or liquid compositions of the invention, especially those containing water.

Suitable water soluble inorganic builder materials include, in particular, alkali metal silicates, alkali metal carbonates and alkali metal phosphates, which may be present in the form of their alkaline, neutral or acidic sodium or potassium salts. Examples thereof are trisodium phosphate, tetrasodium diphosphate, disodium dihydrogen diphosphate, pentasodium triphosphate, so-called sodium hexametaphosphate, oligomeric trisodium phosphate having degrees of oligomerization from 5 to 1000, especially from 5 to 50, and also the corresponding potassium salts and/or mixtures of sodium and potassium salts. Water insoluble, water dispersible inorganic builder materials used are, in particular, crystalline or amorphous alkali metal alumosilicates, in amounts of up to 50% by weight, preferably not more than 40% by weight, and in liquid compositions in particular from 1% by weight to 5% by weight. Among these, preference is given to the crystalline sodium alumosilicates of detergent quality, especially zeolite A, P and, if appropriate, X, alone or in mixtures, in the form for example of a cocrystallizate of zeolites A and X (Vegobond® AX, a commercial product from Condea Augusta S.p.A.). Amounts close to the stated upper limit are used preferably in solid, particulate compositions. Suitable alumosilicates possess in particular no particles having a size of more than 30 $\mu$m, and preferably consist at least 80% by weight of particles having a size below 10 $\mu$m. Their calcium binding capacity, which may be determined in accordance with the information in German Patent DE 24 12 837, is generally in the range from 100 to 200 mg of CaO per gram.

Suitable substitutes or partial substitutes for said alumosilicate are crystalline alkali metal silicates, which may be present alone or in a mixture with amorphous silicates. The alkali metal silicates which can be used as builders in the compositions of the invention preferably have a molar ratio of alkali metal oxide to $SiO_2$ of below 0.95, in particular from 1:1.1 to 1:12, and may be present in amorphous or crystalline form. Preferred alkali metal silicates are the sodium siliates, especially the amorphous sodium silicates, having a molar ratio $Na_2O:SiO_2$ of from 1:2 to 1:2.8. Those with a molar ratio $Na_2O:SiO_2$ of from 1:1.9 to 1:2.8 may be prepared by the process of European Patent Application EP 0 425 427. As crystalline silicates which may be present alone or in a mixture with amorphous silicates it is preferred to use crystalline phyllosilicates of the general formula $Na_2Si_xO_{2x+1}.yH_2O$, where x, the so-called modulus, is a number from 1.9 to 22, in particular from 1.9 to 4, and y is a number from 0 to 33, and preferred values for x are 2, 3 or 4. Crystalline phyllosilicates which fall under this general formula are described, for example, in European Patent Application EP 0 164 514. Preferred crystalline phyllosilicates are those where x in the stated general formula adopts the values 2 or 3. In particular, both β- and δ639-sodium disilicates ($Na_2Si_2O_5.yH_2O$) are preferred, with β-sodium disilicate, for example, being obtainable by the process described in International Patent Application WO 91/08171. δ-Sodium silicates having a modulus of between 1.9 and 3.2 may be prepared in accordance with Japanese Patent Applications JP 04/238 809 and JP 04/260 610. In addition, virtually anhydrous crystalline alkali metal silicates of the abovementioned general formula wherein x is a number from 1.9 to 2.1, prepared from amorphous alkali metal silicates, and preparable as described in European Patent Applications EP 0 548 599, EP 0 502 325 and EP 0 452 428, may be used in compositions of the invention. In a further preferred embodiment of compositions of the invention, a crystalline sodium phyllosilicate having a modulus of from 2 to 3 is used, as may be prepared from sand and soda by the process of European Patent Application EP 0 436 835. Crystalline sodium silicates having a modulus in the range from 1.9 to 3.5, as are obtainable by the processes of European Patents EP 0 164 552 and/or EP 0 294 753, are used in a further preferred embodiment of compositions of the invention. Crystalline sheetlike silicates of the abovementioned formula are sold by Clariant GmbH (Germany) under the trade name Na-SKS, e.g., Na-SKS-1 ($Na_2Si_{22}O_{45}.xH_2O$, kenyaite), Na-SKS-2 ($Na_2Si_{14}O_{29}.xH_2O$, magadiite), Na-SKS-3 ($Na_2Si_8O_{17}.xH_2O$) or Na-SKS-4 ($Na_2Si_4O_9.xH_2O$, makatite). Of these, those particularly suitable include Na-SKS-5 ($\alpha$-$Na_2Si_2O_5$), Na-SKS-7 ($\beta$-$Na_2Si_2O_5$, natrosilite), Na-SKS-9 ($NaHSi_2O_5.H_2O$), Na-SKS-10 ($NaHSi_2O_5.3H_2O$, kanemite), Na-SKS-11 (t-$Na_2Si_2O_5$) and Na-SKS-13 ($NaHSi_2O_5$), but especially Na-SKS-6 ($\delta$-$Na_2Si_2O_5$). A review of crystalline phyllosilicates is given, for example, by the articles published in "Hoechst High Chem Magazin 14/1993" on pages 33–38 and in "Seifen-Öle-Fette-Wachse, Vol. 116, No. 20/1990" on pages 805–808. In one preferred embodiment of compositions of the invention, use is made of a granular compound of crystalline phyllosilicate and citrate, of crystalline phyllosilicate and abovementioned (co)polymeric polycarboxylic acid, as is described, for example, in German Patent Application DE 198 19 187, or of alkali metal silicate and alkali metal carbonate, as is described, for example, in International Patent Application WO 95/22592 or as is available commercially, for example, under the name Nabion® 15.

Builder substances may be present in the compositions of the invention, if desired, in amounts of up to 90% by weight. They are preferably present in amounts of up to 75% by weight. Laundry detergents of the invention have builder contents of in particular from 5% by weight to 50% by weight. In compositions of the invention for cleaning hard surfaces, especially for the machine cleaning of kitchen- and tableware, the amount of builder substances is in particular from 5% by weight to 88% by weight, preferably no water insoluble builder materials being used in such compositions. In a preferred embodiment of compositions of the invention intended in particular for the machine washing of kitchen- and tableware, from 20% by weight to 40% by weight of water soluble organic builder, especially alkali metal citrate, from 5% by weight to 15% by weight of alkali metal carbonate, and from 20% by weight to 40% by weight of alkali metal disilicate are present.

Peroxygen compounds suitable for use in compositions of the invention include, in particular, organic peracids or peracidic salts of organic acids, such as phthalimidopercaproic acid, perbenzoic acid or salts of diperdodecanedioic acid, hydrogen peroxide, and inorganic salts which give off hydrogen peroxide under the washing conditions, including perborate, percarbonate, persilicate and/or persulfate such as Caroate. Where solid peroxygen compounds are to be used, they may be employed in the form of powders or granules, which may also have been coated in a manner which is known in principle. Where a composition of the invention does comprise peroxygen compounds, they are present in amounts of preferably up to 50% by weight, in particular from 5% by weight to 30% by weight. The addition of small amounts of known bleach stabilizers such as, for example, of phosphonates, borates and/or metaborates and metasilicates, and also magnesium salts such as magnesium sulfate, may be judicious.

Bleach activators which may be used are compounds which under perhydrolysis conditions give rise to aliphatic peroxo carboxylic acids having preferably 1 to 10 carbon atoms, in particular 2 to 4 carbon atoms, and/or substituted or unsubstituted perbenzoic acid. Suitable substances are those which carry O-acyl and/or N-acyl groups of the stated number of carbon atoms, and/or substituted or unsubstituted benzoyl groups. Preference is given to polyacylated alkylenediamines, especially tetraacetylethylenediamine (TAED), acylated triazine derivatives, especially 1,5-diacetyl-2,4-dioxohexahydro-1,3,5-triazine (DADHT), acylated glycolurils, especially tetraacetylglycoluril (TAGU), N-acyl imides, especially N-nonanoylsuccinimide (NOSI), acylated phenolsulfonates, especially n-nonanoyl- or isononanoyloxybenzenesulfonate (n- or iso-NOBS), carboxylic anhydrides, especially phthalic anhydride, acylated polyhydric alcohols, especially triacetin, ethylene glycol diacetate, 2,5-diacetoxy-2,5-dihydrofuran, and the enol esters known from German Patent Applications DE 196 16 693 and DE 196 16 767, and also acetylated sorbitol and mannitol and/or the mixtures thereof (SORMAN) described in European Patent Application EP 0 525 239, acylated sugar derivatives, especially pentaacetylglucose (PAG), pentaacetyl-fructose, tetraacetylxylose and octaacetyllactose, and acetylated, optionally N-alkylated glucamine and gluconolactone, and/or N-acylated lactams, for example, N-benzoylcaprolactam, which are known from International Patent Applications WO 94/27970, WO 94/28102, WO 94/28103, WO 95/00626, WO 95/14759 and WO 95/17498. The hydrophilically substituted acylacetals known from German Patent Application DE 196 16 769 and acyllactams described in German Patent Application DE 196 16 770 and in International Patent Application WO 95/14075 are likewise used with preference. The combinations of conventional bleach activators known from German Patent Application DE 44 43 177, may also be used. Such bleach activators may be present in customary quantities, preferably in amounts of from 0.5% by weight to 10% by weight, and in particular from 1% by weight to 8% by weight, based on overall composition.

In addition to the above-listed conventional bleach activators, or instead of them, it is also possible for the sulfonimines known from European Patents EP 0 446 982 and EP 0 453 003 and/or bleach boosting transition metal salts or transition metal complexes to be present as so-called bleaching catalysts.

Enzymes which may be used in the compositions in addition to the protease/amylase combination that is essential to the invention include those from the class of the lipases, cutinases, pullulanases, hemicellulases, cellulases, oxidases, laccases and peroxidases, and mixtures thereof. If desired, proteases or amylases other than the protease or amylase essential to the invention may be present in addition to the latter. Particularly suitable active enzymatic substances are those obtained from fungi or bacteria, such as *Bacillus subtilis, Bacillus licheniformis, Streptomyces griseus, Humicola lanuginosa, Humicola insolens, Pseudomonas pseudoalcaligenes, Pseudomonas cepacia* or *Coprinus cinereus*. The enzymes that may be used in addition may—as described, for example, in International Patent Application WO 92/11347 or WO 94/23005—be adsorbed on carrier substances and/or embedded in coating substances in order to protect them against premature inactivation. In the detergents of the invention they are present preferably in amounts of up to 5% by weight, in particular from 0.2% by weight to 4% by weight.

The organic solvents which may be used besides water in the compositions of the invention, especially if they are present in liquid or paste form, include alcohols having 1 to 4 carbon atoms, especially methanol, ethanol, isopropanol and tert-butanol, diols having 2 to 4 carbon atoms, especially ethylene glycol and propylene glycol, and also mixtures thereof and the ethers derivable from the aforementioned classes of compound. Water miscible solvents of this kind are present in the compositions of the invention preferably in amounts of not more than 30% by weight, in particular from 6% by weight to 20% by weight.

Additionally, the compositions may comprise further constituents customary in detergents. These optional constituents include, in particular, enzyme stabilizers, graying inhibitors, color transfer inhibitors, foam inhibitors, and optical brighteners and also dyes and fragrances. In order to protect against silver corrosion, silver corrosion inhibitors may be used in dishwashing detergents of the invention. A cleaning product of the invention for hard surfaces may, furthermore, comprise abrasive constituents, especially from the group consisting of quartz flours, wood flours, polymer flours, chalks and glass microbeads, and mixtures thereof. Abrasives are present in the detergents of the invention preferably at not more than 20% by weight, in particular from 5% by weight to 15% by weight.

In order to adjust the pH to a desired level which does not come about of itself through the mixing of the other components, the compositions of the invention may comprise system-compatible and environmentally compatible acids, especially citric acid, acetic acid, tartaric acid, malic acid, lactic acid, glycolic acid, succinic acid, glutaric acid and/or adipic acid, or else mineral acids, especially sulfuric acid, or bases, especially ammonium hydroxides or alkali metal hydroxides. pH regulators of this kind are present in the compositions of the invention in amounts of preferably not more than 20% by weight, in particular from 1.2% by weight to 17% by weight.

The color transfer inhibitors suitable for use in laundry detergents of the invention include, in particular, polyvinylpyrrolidones, polyvinylimidazoles, polymeric N-oxides such as poly(vinylpyridine N-oxide), and copolymers of vinylpyrrolidone with vinylimidazole.

Graying inhibitors have the function of keeping the soil detached from the textile fiber in suspension in the liquor. Suitable for this purpose are water soluble colloids, usually organic in nature, examples being starch, glue, gelatin, salts of ether carboxylic acids or ether sulfonic acids of starch or of cellulose, or salts of acidic sulfuric esters of cellulose or of starch. Water soluble polyamides containing acidic groups are also suitable for this purpose. Furthermore, starch derivatives other than those mentioned above may be used, aldehyde starches, for example. Preference is given to cellulose ethers, such as carboxymethylcellulose (Na salt), methylcellulose, hydroxyalkylcellulose and mixed ethers, such as methylhydroxyethylcellulose, methylhydroxypropylcellulose, methylcarboxymethylcellulose, and mixtures thereof, in amounts, for example, of from 0.1 to 5% by weight, based on the compositions.

As optical brighteners, laundry detergents of the invention may comprise derivatives of diaminostilbene-disulfonic acid and/or its alkali metal salts. Suitable, for example, are salts of 4,4'-bis(2-anilino-4-morpholino-1,3,5-triazinyl-6-amino) stilbene-2,2'-disulfonic acid or compounds of similar structure which instead of the morpholino group carry a diethanolamino group, a methylamino group, an anilino group, or a 2-methoxyethylamino group. It is also possible for brighteners of the substituted diphenylstyryl type to be present, for example, the alkali metal salts of 4,4'-bis(2-sulfostyryl) biphenyl, 4,4'-bis(4-chloro-3-sulfostyryl)biphenyl, or 4-(4-chlorostyryl)-4'-(2-sulfostyryl)biphenyl. Mixtures of the aforementioned optical brighteners may also be used.

Especially for use in machine processes, it may be of advantage to add customary foam inhibitors to the compositions. Examples of suitable foam inhibitors are soaps of natural or synthetic origin having a high $C_{18}$–$C_{24}$ fatty acid fraction. Examples of suitable nonsurfactant-type foam inhibitors are organo-polysiloxanes and their mixtures with microfine, optionally silanized silica and also paraffins, waxes, microcrystalline waxes, and mixtures thereof with silanized silica or bis-fatty acid alkylene diamides. With advantages, use is also made of mixtures of different foam inhibitors, for example, mixtures comprising silicones, paraffins, or waxes. The foam inhibitors, especially those containing silicone and/or paraffin, are preferably bound on a granular, water soluble or dispersible support substance. Particular preference is given to mixtures of paraffins and bisstearylethylenediamide.

The production of solid compositions of the invention presents no difficulties and may be done conventionally, for example, by spray drying or granulation, with the enzymes and any other heat sensitive ingredients such as bleaches, for example, being added separately later on if desired. To produce compositions of the invention of heightened bulk density, in particular in the range from 650 g/l to 950 g/l, preference is given to a process known from European Patent EP 0 486 592 which includes an extrusion step. Another preferred preparation, with the aid of a granulation process, is described in European Patent EP 0 642 576.

To produce compositions of the invention in tablet form, which may have one or more phases, may have one or more colors, and consist in particular of one layer or of two or more layers, in particular of two layers, it is preferred to follow a procedure in which all of the constituents—per one layer if appropriate—are mixed with one another in a mixer and the mixture is compressed by means of conventional tableting presses, for example, eccentric presses or rotary presses, at pressing forces in the range from about 50 to 100 kN, preferably from 60 to 70 kN. Especially in the case of multilayer tablets it may be of advantage if at least one layer is compressed beforehand. This is preferably accomplished at pressing forces of between 5 and 20 kN, in particular from 10 to 15 kN. In this way, tablets which are fracture resistant and yet dissolve sufficiently quickly under application conditions are obtained without problems, having fracture strengths and flexural strengths of normally from 100 to 200 N, but preferably above 150 N. A tablet produced in this way preferably has a weight of from 10 g to 50 g, in particular from 15 g to 40 g. The three-dimensional form of the tablets is arbitrary and may be circular, oval or angular, with intermediate forms also being possible. Corners and edges are advantageously rounded. Circular tablets preferably have a diameter of from 30 mm to 40 mm. In particular, the size of tablets of angular or cuboid design which are introduced predominantly by way of the dosing apparatus of, for example, the dishwashing machine is dependent on the geometry and on the volume of this dosing apparatus. Embodiments which are preferred by way of example have a basal area of (from 20 to 30 mm)×(from 34 to 40 mm), in particular of 26×36 mm or of 24×38 mm.

Liquid or paste detergents of the invention in the form of solutions comprising customary solvents are generally prepared by simply mixing the ingredients, which may be introduced in bulk or in solution into an automatic mixer.

EXAMPLES

Example 1

To determine the washing power, cotton fabric soiled with standardized test stains was washed at 40° C. (detergent dosing 76 g; water hardness 16° d [German hardness]; load 3.5 kg, short program) in a domestic washing machine (Miele® W 701). Table 1 below reports the wash results (in dE initial value minus dE after washing, measuring instrument Minolta® CR 310) for a detergent V1 containing 0.25% by weight of noninventive amylase granules (Termamyl® 60 T) and 0.25% by weight of protease granules (activity 200,000 PU/g) containing the *Bacillus lentus* protease, for a detergent V2 of otherwise the same composition but containing, instead of Termamyl®, the protein-equivalent amount of the genetically modified amylase Duramyl®, for a detergent V3 of otherwise the same composition as V1 but containing, instead of Termamyl®, the protein-equivalent amount of the genetically modified amylase Purafect® OxAm, for a detergent V4 of otherwise the same composition as V1 but containing, instead of Termamyl®, the protein-equivalent amount of the fungal amylase Fungamyl®, and for an inventive detergent M1 of otherwise the same composition as V1 but containing, instead of Termamyl®, the protein-equivalent amount of the amylase from *Bacillus amyloliquefaciens*, as the result of 4-fold determinations.

TABLE 1

Washing results (dE IV - dE washed)

| Composition | Washing result with soiling A | B | C |
|---|---|---|---|
| M1 | 45.5 | 41.3 | 23.2 |
| V1 | 36.0 | 27.1 | 20.0 |
| V2 | 35.9 | 26.0 | 21.7 |
| V3 | 34.0 | 26.6 | 19.8 |
| V4 | 34.9 | 24.3 | 16.4 |

Soiling
A: Oatflakes/milk/cocoa
B: Oatflakes/water/cocoa
C: Chocolate blancmange As can be seen, the composition of the invention has a wash performance which is markedly superior to that of the compositions containing a different amylase.

Example 2

Detergents (V5 and V6, respectively) for the machine washing of kitchen- and tableware, comprising 55% by weight sodium tripolyphosphate (calculated as anhydrous), 4% by weight amorphous sodium disilicate (calculated as anhydrous), 22% by weight sodium carbonate, 9% by weight sodium perborate, 2% by weight TAED, 2% by weight nonionic surfactant, and also 1% by weight or 2% by weight amylase granules (Termamyl® 60T) and 1.4% by weight protease granules (activity 200,000 PU/g) comprising the *Bacillus lentus* protease (remainder to 100% by weight water, perfume and dye), compositions (V7 and V8 respectively), whose composition was otherwise like that of V5 and V6, respectively, but which instead of Termanyl® contained ilk protein-equal amounts of Duramyl®, and also compositions in accordance with the invention (M2 and M3, respectively), whose composition was otherwise like that of V5 and V6, respectively, but which instead of Termamyl® contained protein-equal amounts of amylase from *Bacillus amyloliquefaciens*, were tested as indicated below:

In a Miele® G 575 dishwasher (additions of 20 g of each test composition in the universal program, water hardness 14–16° dH [German hardness], operating temperature 55° C.), in each case 6 plates soiled with standardized starch stains were washed and the remaining stain residue was determined gravimetrically and related to the initial value prior to washing (i.e., 100%). The table below indicates in each case the percentage of stain removed.

TALBE 2

Cleaning performance [% starch removal]

| Composition | Cleaning performance |
|---|---|
| V5 | 56 |
| V7 | 83 |
| M2 | 90 |
| V6 | 63 |
| V8 | 90 |
| M3 | 92 |

It can be seen that the compositions of the invention are significantly superior to the noninventive compositions in cleaning performance.

What is claimed is:

1. A detergent composition comprising a protease and an amylase, wherein the amylase is alpha-amylase derived from *Bacillus amyloliquefaciens* and the protease is derived from *Bacillus lentus*, which protease has one or more amino acid replacements selected from the group consisting of S3T, V4I, R99G, R99A, R99S, A188P, V193M, V199I, L211D and L211E, by *Bacillus lentus* DSM 5843 alkaline protease numeration.

2. The detergent composition of claim 1, wherein the amylase is present in an amount from 0.001 to 0.5 mg per gram of the detergent composition.

3. The detergent composition of claim 1, wherein the amylase is present in an amount from 0.02 to 0.3 mg per gram of the detergent composition.

4. The detergent composition of claim 1, wherein the detergent composition has a proteolytic activity of from 100 PU/g to 10,000 PU/g.

5. The detergent composition of claim 1, wherein the detergent composition has a proteolytic activity of from 300 PU/g to 8,000 PU/g.

6. The detergent composition of claim 1, wherein the protease is a protease mutant from genetically-modified *Bacillus lentus*, and wherein the protease mutant has the amino acid replacement S3T+V4I+V193M+V199I+L211D, wherein the amino acid position is determined using *Bacillus lentus* DSM 5843 alkaline protease counting.

7. The detergent composition of claim 1 further comprising at least one substance selected from the group consisting of builders, surfactants, bleaches, bleach activators, water-miscible organic solvents, additional enzymes, sequesterants, electrolytes, pH regulators, optical brighteners, graying inhibitors, color transfer inhibitors, foam regulators, silver corrosion inhibitors, dyes, and fragrances.

8. The detergent composition of claim 1 further comprising at least one surfactant selected from the group consisting of anionic, nonionic, cationic, zwitterionic, and amphoteric surfactants.

9. The detergent composition of claim 8, wherein the surfactant is present in an amount of from 0.5 to 50 percent by weight, based on the detergent composition.

10. The detergent composition of claim 1 further comprising at least one builder, wherein the builder present in an amount up to 90 percent by weight, based on the weight of the detergent composition.

11. The detergent composition of claim 1 further comprising at least one peroxygen compound, wherein the peroxygen compound is present in an amount up to 50 percent by weight, based on the weight of the detergent composition.

12. The detergent composition of claim 1 further comprising at least one bleach activator, wherein the bleach activator is present in an amount from 0.5 to 10 percent by weight, based on the weight of the detergent composition.

13. The detergent composition of claim 1 further comprising at least one additional enzyme, wherein the additional enzyme is present in an amount up to 5 percent by weight, based on the weight of the detergent composition.

14. The detergent composition of claim 1 further comprising at least one organic solvent, wherein the organic solvent is present in an amount up to 30 percent by weight, based on the weight of the detergent composition.

15. The detergent composition of claim 1 further comprising at least one pH regulator, wherein the pH regulator is present in an amount up to 20 percent by weight, based on the weight of the detergent composition.

16. A detergent composition comprising a protease from *Bacillus lentus*, which protease has one or more amino acid replacements selected from the group consisting of S3T, V4I, R99G, R99A, R99S, A188P, V193M, V199I, L211D and L211E, by *Bacillus lentus* DSM 5843 alkaline protease numeration, an alpha-amylase from *Bacillus amyloliquefaciens*, and at least one substance selected from the group consisting of builders, surfactants, bleaches, bleach activators, water-miscible organics solvents, additional enzymes, sequesterants, electrolytes, pH regulators, optical brightners, graying inhibitors, color transfer inhibitors, from regulators, silver corrosion inhibitors, dyes, and fragrances.

17. The process of enhancing the cleaning performance of detergents comprising the step of combining alpha-amylase from *Bacillus amyloliquefaciens* and protease from *Bacillus lentus* which has one or more amino acid replacements selected from the group consisting of S3T, V4I, R99G, R99A, R99S, A188P, V193M, V199I, L211D and L211E, by *Bacillus lentus* DSM 5843 alkaline protease numeration, with at least one detergent ingredient.

18. The process of claim 17, wherein the cleaning performance is the enhanced removal of starchy stains.

* * * * *

UNITED STATES PATENT AND TRADEMARK OFFICE

CERTIFICATE OF CORRECTION

PATENT NO. : 6,380,147 B1
DATED : April 30, 2002
INVENTOR(S) : Speckmann et al.

It is certified that error appears in the above-identified patent and that said Letters Patent is hereby corrected as shown below:

Column 16,
Line 32, delete "brightners", and insert therefor -- brighteners --.
Line 33, delete "from", and insert therefor -- foam --.

Signed and Sealed this

Eighth Day of July, 2003

JAMES E. ROGAN
*Director of the United States Patent and Trademark Office*